United States Patent
Fornara et al.

(10) Patent No.: US 9,916,902 B2
(45) Date of Patent: Mar. 13, 2018

(54) METHOD FOR DETECTING A THINNING OF THE SEMICONDUCTOR SUBSTRATE OF AN INTEGRATED CIRCUIT FROM ITS BACK FACE AND CORRESPONDING INTEGRATED CIRCUIT

(71) Applicant: STMicroelectronics (Rousset) SAS, Rousset (FR)

(72) Inventors: Pascal Fornara, Pourrieres (FR); Christian Rivero, Rousset (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 0 days.

(21) Appl. No.: 15/218,261

(22) Filed: Jul. 25, 2016

(65) Prior Publication Data
US 2017/0243652 A1 Aug. 24, 2017

(30) Foreign Application Priority Data
Feb. 22, 2016 (FR) .................. 16 51424

(51) Int. Cl.
*H01L 23/00* (2006.01)
*H01L 27/115* (2017.01)
(Continued)

(52) U.S. Cl.
CPC ........ *G11C 16/22* (2013.01); *H01L 21/31116* (2013.01); *H01L 21/74* (2013.01);
(Continued)

(58) Field of Classification Search
CPC .. H01L 23/57–23/576; H01L 21/31116; H01L 27/115; H01L 27/11512; H01L 22/34; H01L 22/14; H01L 21/823481; H01L 21/823892; H01L 29/7846; H01L 21/768; H01L 21/76805; H01L 21/76898; H01L 21/823475; H01L 21/74; G11C 16/22
See application file for complete search history.

(56) References Cited

U.S. PATENT DOCUMENTS 8,809,858 B2 8/2014 Lisart et al.
8,896,068 B2 11/2014 Mayuzumi
(Continued)

FOREIGN PATENT DOCUMENTS

FR 2986356 A1 8/2013

OTHER PUBLICATIONS

INPI Search Report and Written Opinion for FR 1651424 dated Nov. 10, 2016 (6 pages).
(Continued)

*Primary Examiner* — Thanhha Pham
(74) *Attorney, Agent, or Firm* — Gardere Wynne Sewell LLP

(57) ABSTRACT

The thinning of a semiconductor substrate of an integrated circuit from a back face is detected using the measurement of a physical quantity representative of the resistance between the ends of two electrically-conducting contacts situated at an interface between an insulating region and an underlying substrate region. The two electrically-conducting contacts extend through the insulating region to reach the underlying substrate region.

10 Claims, 2 Drawing Sheets

(51) Int. Cl.

| | | |
|---|---|---|
| *H01L 21/82* | (2006.01) | |
| *H01L 29/78* | (2006.01) | |
| *G11C 16/22* | (2006.01) | |
| *H01L 21/311* | (2006.01) | |
| *H01L 21/8238* | (2006.01) | |
| *H01L 21/8234* | (2006.01) | |
| *H01L 21/74* | (2006.01) | |
| *H01L 21/66* | (2006.01) | |

(52) U.S. Cl.
CPC ........... *H01L 21/823481* (2013.01); *H01L 21/823892* (2013.01); *H01L 22/14* (2013.01); *H01L 22/34* (2013.01); *H01L 23/57* (2013.01); *H01L 23/576* (2013.01); *H01L 27/115* (2013.01); *H01L 29/7846* (2013.01)

(56) References Cited

U.S. PATENT DOCUMENTS

| | | |
|---|---|---|
| 2005/0029653 A1 | 2/2005 | Aumuller et al. |
| 2010/0187527 A1 | 7/2010 | Van Geloven et al. |
| 2013/0193437 A1* | 8/2013 | Lisart ..................... H01L 23/57 |
| | | 257/48 |

OTHER PUBLICATIONS

DE Search Report and Written Opinion for co-pending DE Appl. No. 10-2016-116-228.0 dated Apr. 27, 2017 (10 pages).

\* cited by examiner

METHOD FOR DETECTING A THINNING OF THE SEMICONDUCTOR SUBSTRATE OF AN INTEGRATED CIRCUIT FROM ITS BACK FACE AND CORRESPONDING INTEGRATED CIRCUIT

PRIORITY CLAIM

This application claims priority from French Application for Patent No. 1651424 filed Feb. 22, 2016, the disclosure of which is incorporated by reference.

TECHNICAL FIELD

The invention relates to integrated circuits and, more particularly, the detection of a potential thinning of the substrate of an integrated circuit from its back face.

BACKGROUND

Integrated circuits, in particular those equipped with memories containing sensitive information, must as far as possible be protected against attacks, in particular designed to discover stored data.

One possible attack may be effected by a focused beam of ions (FIB—Focused Ion Beam), for example by means of a laser beam.

The efficiency of such an attack increases when the substrate of the integrated circuit is thinned by the perpetrator, starting from its back face in such a manner as to come as near as possible to the components of the integrated circuit, formed on its front face.

SUMMARY

According to one embodiment and its implementation, a detection is accordingly provided of a possible thinning of the substrate of an integrated circuit from its back face, which is simple to implement and particularly compact in terms of surface area occupied.

Thus, the use is advantageously provided of the space occupied by the insulating regions, for example of the 'shallow trench isolation' (using the acronym STI) type, of the integrated circuit so as to form electrically-conducting contacts whose ends will emerge into the underlying substrate region in such a manner as to be able to measure a quantity representative of the resistance between these two ends.

The formation of these two contacts extending into an insulating region has no impact on the surface area occupied by the integrated circuit. Moreover, a thinning of the substrate until it comes very close to, or even reaches, the insulating region will lead to an increase in the resistance between these two contacts which will be readily measurable.

The formation of such contacts is also advantageously provided by a method perfectly compatible with the conventional methods for fabricating integrated circuits.

According to one aspect, a method is provided for detecting a thinning of the semiconductor substrate of an integrated circuit from its back face, comprising a measurement of a physical quantity representative of the resistance between the ends of two electrically-conducting contacts situated at the interface between an insulating region, for example a shallow trench isolation, and an underlying substrate region, the two electrically-conducting contacts extending, at least partially, into the insulating region.

According to another aspect, an integrated circuit is provided, comprising a semiconductor substrate, at least one insulating region, for example of the shallow trench isolation type, formed within the substrate, and a detector comprising two electrically-conducting contacts extending, at least partially, into the insulating region, each having a first end situated at the interface between the insulating region and an underlying substrate region, and a second end; the two second ends are intended to be connected to an electrical circuit, preferably incorporated into the integrated circuit, configured for delivering an electrical signal representative of a value of the resistance between the two first ends.

According to one embodiment, the integrated circuit generally comprises a dielectric layer (known by those skilled in the art under the acronym PMD for Pre-Metal Dielectric) situated on top of the substrate, and at least a first metallization level situated on top of the dielectric layer. The two electrically-conducting contacts then also extend into the dielectric layer, their second end opening onto the first metallization level.

Generally, an integrated circuit comprises several components protruding from the substrate. This is the case, for example, for the transistor gate regions. These transistors may be single-gate transistors with various thicknesses of gate oxide, or else dual-gate transistors such as those used in non-volatile memories (FLASH or EEPROM memory).

The integrated circuit then generally comprises an etch-stop layer (called CESL: Contact Etch-Stop Layer) notably covering the protruding parts of the components and situated between, on the one hand, the dielectric layer and, on the other hand, the substrate and the insulating region. Additional electrically-conducting contacts then come into contact with some of the protruding parts of the components and with silicided regions (regions comprising a metal silicide) of the substrate through the etch-stop layer.

In addition, the two electrically-conducting contacts used for identifying a possible thinning of the substrate also pass through the etch-stop layer.

According to another aspect, a method is provided for the formation of the two electrically-conducting contacts of the integrated circuit such as defined hereinbefore, in which the etch operations used for forming these two contacts are identical to those used to form the additional contacts.

More precisely, according to one embodiment in which the semiconductor substrate comprises silicon, the etch operations comprise a final etch step, selective with respect to the silicon and to the metal silicide of the silicided regions, designed to etch the etch-stop layer, this final etch step being a timed etch process also allowing the material of the insulating region to be etched, the etch time being determined as a function of the depth of the insulating region.

The inventors have indeed observed that this final etch step allowing the etch-stop layer to be etched, in order to allow the future contacts to come into contact with the silicided regions, also allowed the insulating region to be etched, without any particular modification, in such a manner as to form the orifices designed to receive the future contacts allowing a possible thinning of the substrate to be detected.

For this purpose, it suffices to determine the etch time as a function of the depth of the insulating region in order to make the orifices come out at the interface with the underlying substrate region. Furthermore, since this etch is selective with respect to the silicon and to the metal silicide, the additional etch time will only have a very limited impact notably on the silicided regions.

It is accordingly noted here that the formation of these contacts within the insulating region is perfectly compatible with the existing conventional etch operations in an integrated circuit and only require a modification of the "contacts" mask.

BRIEF DESCRIPTION OF THE DRAWINGS

Other advantages and features of the invention will become apparent upon examining the detailed description of non-limiting embodiments and their implementation, and from the appended drawings in which.

DETAILED DESCRIPTION

Figure 1:
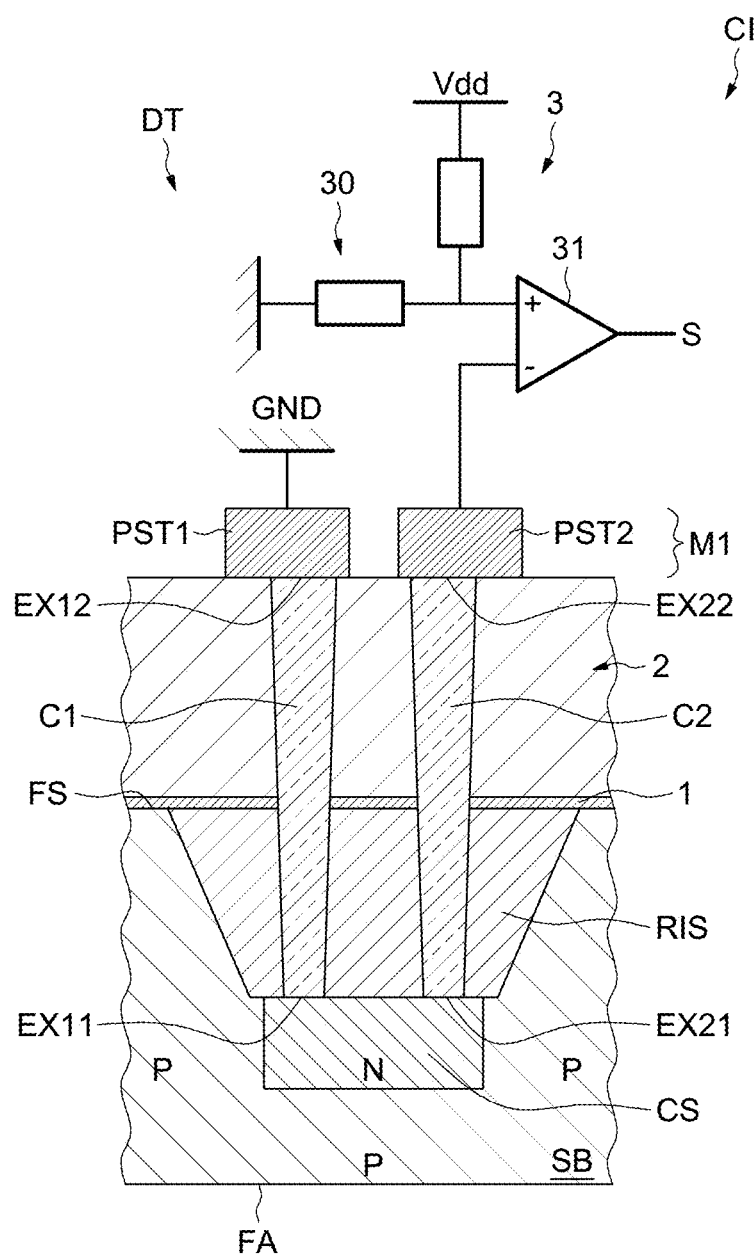
FIGS. 1 and 2 are schematic illustrations of various embodiments and implementations.

In FIG. 1, the reference CI denotes an integrated circuit comprising a semiconductor substrate SB, for example with a P type conductivity, comprising at least one insulating region RIS, for example of the shallow trench isolation (STI) type which, in the example illustrated here, is situated on top of a well CS with an N type of conductivity.

The top face (or front face) FS of the substrate is covered with an etch-stop layer 1 (CESL layer) generally of silicon nitride SiN. This layer 1 is covered with a dielectric layer 2, commonly denoted by those skilled in the art under the acronym PMD (pre-metallization dielectric), which separates the etch-stop layer 1 from the first metallization level M1 of the interconnection part of the integrated circuit, commonly denoted by those skilled in the art under the acronym BEOL (for Back End Of Line).

In order to be able to detect a potential thinning of the substrate SB from its back face FA, opposite to its top or front face FS, the integrated circuit IC comprises a detector DT here comprising two electrically-conducting contacts C1, C2 extending through the dielectric layer 2, the etch-stop layer 1 and the insulating region RIS.

The two contacts C1 and C2 respectively have two first ends EX11 and EX21 situated at the interface between the insulating region RIS and the underlying substrate region, here the well CS.

The two contacts C1 and C2 also respectively comprise two second ends EX12 and EX22, opposite to the first ends, situated at the interface between the dielectric layer 2 and the first metallization level M1.

These two second ends EX12 and EX22 are in contact with two metal tracks PST1 and PST2 of the metallization level M1 which are connected to an electrical circuit 3.

Although not indispensable, this electrical circuit 3 is preferably incorporated within the integrated circuit IC.

The electrical circuit 3 comprises here, by way of non-limiting example, a comparator 31 whose non-inverting input is connected to a voltage divider bridge 30 and whose inverting input is connected to the metal track PST2 and hence to the contact C2.

The other metal track PST1, and hence the other contact C1, is connected to a supply voltage, here ground GND.

The comparator 31 compares the voltage present on the metal track PST2 with the reference voltage supplied by the voltage divider 30 and delivers a signal S whose value is representative of the fact that the voltage present on the metal track PST2 is lower or otherwise than the reference voltage.

Moreover, the voltage PST2 is a quantity representative of the current flowing in the resistive channel formed by the two contacts C1 and C2 and the underlying substrate region CS, and notably of the resistance of this underlying substrate region.

If the substrate is not thinned, the resistance between the two first ends EX11 and EX21 is low, for example of the order of 10 k$\Omega$, for a distance L between the two contacts, for example, of the order of 0.8 microns and a width W equal to 0.8 µm (for a 90 nanometer technology).

In contrast, if an attacker thins the substrate SB so as to come very near to, or even reach, the insulating region RIS, then the resistance between the two first ends EX11 and EX21 increases significantly (to reach for example a value of 20 k$\Omega$), which then causes an increase in the voltage on the track PST2 and the switching of the comparator 31, the signal S then being representative of a thinning of the substrate.

It will be evident that, in this case, processing means, for example a logic circuit, not shown here, can inhibit the operation of the integrated circuit.

Figure 2:
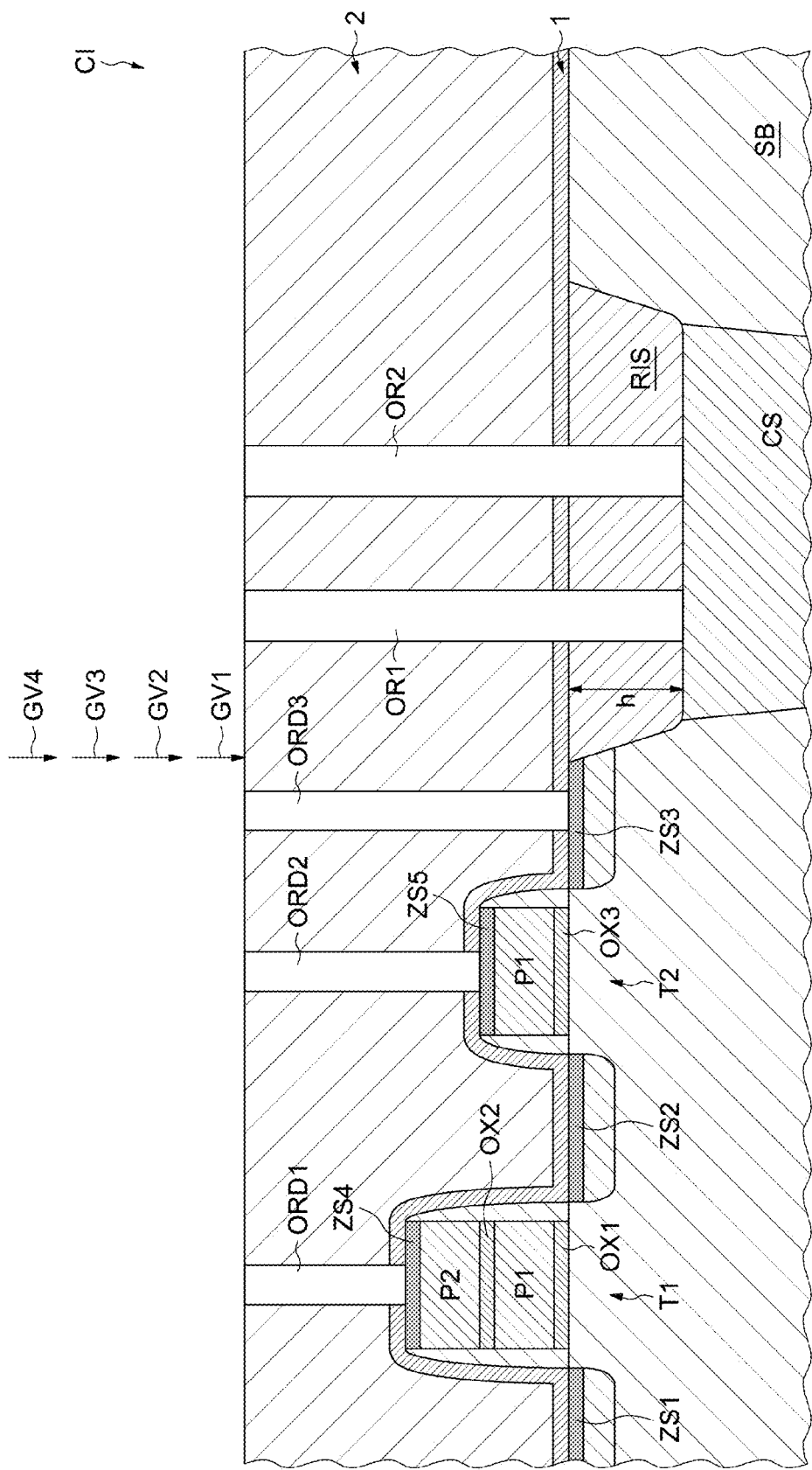

Reference is now more particularly made to FIG. 2 in order to describe one embodiment of the contacts C1 and C2.

FIG. 2 shows schematically other components of the integrated circuit such as, by way of non-limiting example, two transistors T1 and T2.

The transistor T1 is a transistor with a dual gate region P1 and P2, such as those used in non-volatile memories for example of the FLASH or EEPROM type.

The first gate region P1 is isolated from the substrate by a first gate oxide OX1 and the two gate regions P1 and P2 are mutually isolated by a second gate oxide OX2.

The transistor T2 is a conventional transistor whose gate region P1 is separated from the substrate by a gate oxide OX3.

The source, drain and gate regions of these transistors conventionally comprise, close to their surface, regions of metal silicide (silicided regions) ZS1, ZS2, ZS3, ZS4 and ZS5.

Certain of these silicided regions are intended to be contacted by additional electrically-conducting contacts, for example the silicided regions ZS3, ZS4 and ZS5.

FIG. 2 shows the orifices ORD1, ORD2 and ORD3 that will be filled by one or more electrically-conductive materials, for example tungsten, so as to form the aforementioned three additional electrically-conducting contacts, together with the two orifices OR1 and OR2 intended to be filled by the same electrically-conducting metal, so as to form the two electrically-conducting contacts C1 and C2.

These various orifices result from etch steps here comprising four plasma etch operations, GV1, GV2, GV3 and GV4 having conventional characteristics notably in terms of process gases employed.

Conventionally, the dielectric layer 2 is covered with an antireflective layer, generally known by those skilled in the art under the acronym BARC. This antireflective layer is under a layer of photoresist which undergoes a photolithographic step and an exposure to light in such a manner as to define the locations of the various orifices ORD1-ORD3 and OR1-OR2.

Subsequently, after development of the resist, the first etch GV1, which is conventionally a plasma etch, is carried out so as to remove the portion of antireflective layer situated within the holes of the resist.

By way of non-limiting example, in a 90 nanometer technology, $CF_4$ may be used as a process gas at a pressure of around 80 millitorr.

Subsequently, a second etch GV2 is carried out which will allow a first part of the dielectric layer 2 to be etched.

This second etch GV2 is a fairly aggressive plasma etch which uses for example $CH_2F_2$ as process gas at a pressure of 100 millitorr.

However, this aggressive etch produces a "barrel" effect in the orifices; in other words, the more it is etched, the bigger the diameter of the orifice will get.

It is for this reason that this second etch GV2 is interrupted after a chosen time to be replaced by a third etch GV3 which will not only etch the remainder of the dielectric layer 2 but will also polymerize the sides of the orifice in such a manner as to eventually obtain a virtually cylindrical orifice.

By way of non-limiting example, $C_4F_6$ could be chosen for such a third plasma etch GV3 at a pressure of around 45 millitorr.

When these etch operations are finished, the various orifices open out onto the etch-stop layer 1.

A fourth plasma etch GV4 is then carried out so as to etch the layer 1 in order to open out onto the silicided regions ZS4, ZS5 and ZS3.

By way of non-limiting example, this time $CHF_3$ can be used as process gas at a pressure of around 120 millitorr.

This fourth etch GV4 is a timed etch which also allows, as illustrated in FIG. 2, the insulating material, for example silicon silicide, of the insulating region RIS to be etched.

The etch time depends on the height h of the insulating region and those skilled in the art will know how to adjust the etch time as a function of the characteristics of the etch in such a manner that the orifices OR1 and OR2 reach the underlying substrate region CS.

Moreover, this lengthening of the etch time has virtually no impact on the silicided regions ZS3, ZS4 and ZS5 because this etch chemistry is selective with respect to the metal silicide and to the silicon.

For this reason, the formation of the two contacts C1 and C2 will only have required a local modification of the "contacts" mask and an increase in the time of the etch GV4 with respect to a conventional etch GV4.

The invention claimed is:

1. An integrated circuit, comprising:
   a semiconductor substrate,
   at least one insulating region formed within the semiconductor substrate,
   an underlying semiconductor substrate region below the at least one insulating region, and
   a detector comprising first and second electrically-conducting contacts extending, at least partially, into the insulating region, each having a first end situated at an interface between the insulating region and the underlying semiconductor substrate region and having a second end,
   wherein the second ends are connected to an electrical circuit configured to generate an electrical signal representative of a value of a resistance of the underlying semiconductor substrate region between the first ends.

2. The integrated circuit according to claim 1, further comprising:
   a dielectric layer situated on top of the semiconductor substrate, and
   at least a first metallization level situated on top of the dielectric layer,
   wherein the first and second electrically-conducting contacts also extending into the dielectric layer, and
   wherein the second ends open onto the first metallization level.

3. The integrated circuit according to claim 2, further comprising:
   transistor components protruding from a top surface of the semiconductor substrate,
   an etch-stop layer covering protruding parts of the transistor components and situated between the dielectric layer and the semiconductor substrate and the insulating region,
   additional electrically-conducting contacts coming into contact with the protruding parts of the transistor components and with silicided regions of the semiconductor substrate through the etch-stop layer, and
   wherein the first and second electrically-conducting contacts also pass through the etch-stop layer.

4. The integrated circuit according to claim 1, wherein the at least one insulating region is a shallow trench isolation.

5. The integrated circuit according to claim 1, wherein the electrical circuit is incorporated into the integrated circuit.

6. The integrated circuit according to claim 1, wherein the semiconductor substrate is doped with a first conductivity type and the underlying semiconductor substrate region is doped with a second conductivity type opposite the first conductivity type.

7. An integrated circuit, comprising:
   a semiconductor substrate of a first conductivity type;
   an insulating region formed in the semiconductor substrate;
   a doped region of the semiconductor substrate underneath the insulating region, said doped region being doped with a second conductivity type opposite the first conductivity type;
   a first metal contact extending through the insulating region to make a first contact with the doped region of the semiconductor substrate;
   a second metal contact extending through the insulating region to make a second contact with the doped region of the semiconductor substrate; and
   a circuit supported by the semiconductor substrate that is coupled to at least one of the first and second metal contacts, said circuit configured to sense a change in resistance of the doped region of the semiconductor substrate between the first and second contacts.

8. The integrated circuit of claim 7, wherein the circuit comprises a comparator circuit having a first input coupled to said at least one of the first and second metal contacts.

9. The integrated circuit according to claim 7, wherein the doped region of the semiconductor substrate is configured to present a change in resistance between the first and second contacts in response to a thinning of a back side of the semiconductor substrate.

10. The integrated circuit of claim 7, further comprising an etch stop layer over a top surface of the semiconductor substrate, wherein the first and second metal contacts extend through the etch stop layer.

* * * * *